Oct. 29, 1935. A. N. SPANEL 2,019,197
RUBBER BAG
Filed Oct. 10, 1932
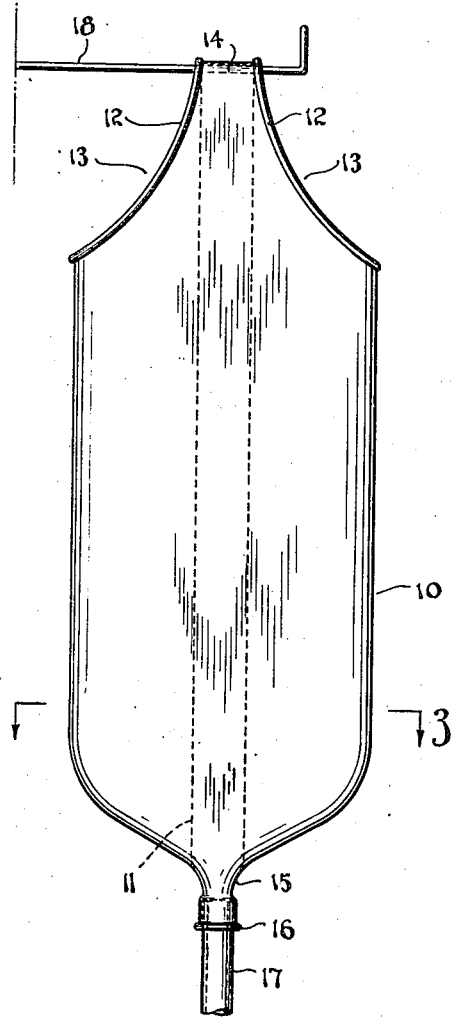
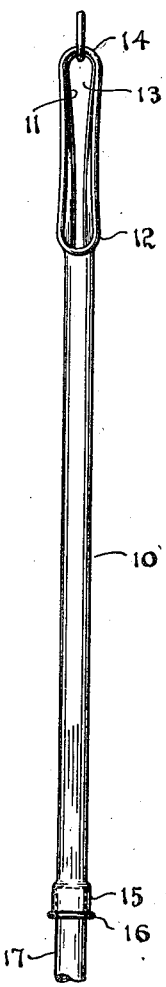
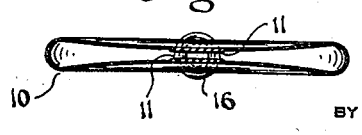
INVENTOR
Abraham N. Spanel
ATTORNEYS Patented Oct. 29, 1935

2,019,197

UNITED STATES PATENT OFFICE 2,019,197

RUBBER BAG

Abraham N. Spanel, Rochester, N. Y.

Application October 10, 1932, Serial No. 637,034

2 Claims. (Cl. 150—1)

This invention relates to rubber bags such as douche bags.

The general purpose of the invention is to provide a convenient, inexpensive, rubber bag with an integral handle construction.

The foregoing and other purposes of the invention are obtained in the rubber bag illustrated in the accompanying drawing and described below. It is to be understood that the invention is not to be limited to the particular form thereof shown and described.

Of the accompanying drawing,

Figure 1 is a front elevation of the improved bag hanging upon a suitable support;

Figure 2 is a side elevation thereof; and

Figure 3 is a section on line 3—3 of Figure 1.

Referring to the drawing, the bag is indicated at 10 and may be made by a rubber depositing process to any suitable shape by using a form of the desired shape. The bag is preferably made by one or more dippings of the form into a solution or water dispersion of rubber. A reinforcing strip 11 of rubber or other material may be incorporated between dippings to extend through the handle to be formed and lengthwise from the top to the bottom of both sides of the bag. It will be understood that the layer or layers of rubber forming the bag may be applied to the form in any other suitable manner.

The form may be so shaped at the top in a known manner (not shown) as to provide a portion upon which the deposited rubber may be slit and rolled upon itself as at 12 to form an opening 13 at each side of the top of the bag, the openings 13 defining an integral handle 14 for the bag, the bag being adapted to be filled or emptied through either of the openings 13. It will be understood that the rubber which has been rolled back upon itself, as indicated at 12, serves to reinforce the bag at the edges of the openings 13 and thereby prevents the tearing of these edges.

The bottom of the bag may be formed with the usual neck 15 having a rolled bead 16 at its end and adapted to be attached in the usual way to a flexible tube 17 to provide a douche bag. However, the invention is not limited to douche bags and the bottom of the bag may be otherwise formed.

The bag when not in use may be suspended by its handle on any suitable support such as indicated at 18. When using the bag as a douche bag it may be so suspended in an elevated position.

Modifications of the invention may be resorted to without departing from the spirit thereof or the scope of the appended claims.

What is claimed is:

1. A one piece seamless rubber bag having openings provided therein, one on each side of the top thereof to define an integral handle at the top of the bag, said openings communicating with the interior of the bag for filling the same, the bottom of said bag being formed with an integral neck having an opening therein for the connection of a tube to the bag for emptying the same.

2. A one piece seamless rubber bag having openings provided therein, one on each side of the top thereof to define an integral handle at the top of the bag, said openings communicating with the interior of the bag for filling the same, the bottom of said bag being formed with an integral neck having an opening therein for the connection of a tube to the bag for emptying the same, the edges of the bag at said openings having reinforcements integral with the body of the bag.

ABRAHAM N. SPANEL.